United States Patent
Leitner et al.

(10) Patent No.: US 12,014,511 B2
(45) Date of Patent: Jun. 18, 2024

(54) SAMPLE IMAGING VIA TWO-PASS LIGHT-FIELD RECONSTRUCTION

(71) Applicant: MOLECULAR DEVICES (AUSTRIA) GMBH, Hallein (AT)

(72) Inventors: Raimund Leitner, Puch/Hallein (AT); Jan Steinbrener, Puch/Hallein (AT)

(73) Assignee: Molecular Devices (Austria) GmbH (AT)

( * ) Notice: Subject to any disclaimer, the term of this patent is extended or adjusted under 35 U.S.C. 154(b) by 208 days.

(21) Appl. No.: 17/634,491

(22) PCT Filed: Aug. 11, 2020

(86) PCT No.: PCT/IB2020/057552
§ 371 (c)(1),
(2) Date: Feb. 10, 2022

(87) PCT Pub. No.: WO2021/028836
PCT Pub. Date: Feb. 18, 2021

(65) Prior Publication Data
US 2022/0270279 A1    Aug. 25, 2022

Related U.S. Application Data

(60) Provisional application No. 62/885,735, filed on Aug. 12, 2019.

(51) Int. Cl.
*G06T 7/557*    (2017.01)
*G02B 21/36*    (2006.01)
*G06T 3/10*    (2024.01)

(52) U.S. Cl.
CPC .......... *G06T 7/557* (2017.01); *G02B 21/361* (2013.01); *G02B 21/365* (2013.01); *G06T 3/10* (2024.01);

(Continued)

(58) Field of Classification Search
CPC .......... G06T 7/557; G06T 3/0056; G06T 2207/10012; G06T 2207/10052;

(Continued)

(56) References Cited

U.S. PATENT DOCUMENTS

2013/0120356 A1    5/2013  Georgiev et al.
2019/0162945 A1*   5/2019  Hua ............... H04N 23/56

FOREIGN PATENT DOCUMENTS

EP    3 188 123 A1    7/2017

OTHER PUBLICATIONS

International Search Report and Written Opinion of the International Searching Authority for International Patent Application No. PCT/IB2020/057552 dated Nov. 13, 2020, 10 pages.

(Continued)

*Primary Examiner* — Farzana Hossain
(74) *Attorney, Agent, or Firm* — Merchant & Gould P.C.

(57) ABSTRACT

Methods and systems for sample imaging via two-pass light-field reconstruction. In an exemplary method, a light-field image of a sample may be captured in a light-field plane. The light-field image may be forward-projected computationally to each of a plurality of z-planes in object space to generate a set of forward-projected z-plane images. Backward-projections computationally to the light-field plane of the same xy-region in object space from each z-plane image may be compared with the light-field image, to determine a respective degree of correspondence between the backward-projected xy-region from each of the z-plane images and the light-field image. For each different xy-region, at least one of the forward-projected z-plane images may be selected to contribute data for the different xy-region in a 2D or 3D object-space image of the sample.

20 Claims, 10 Drawing Sheets

(52) U.S. Cl.
CPC ............... *G06T 2207/10012* (2013.01); *G06T 2207/10052* (2013.01)

(58) Field of Classification Search
CPC ..... G06T 2200/21; G06T 5/50; G02B 21/361; G02B 21/365
See application file for complete search history.

(56) References Cited

OTHER PUBLICATIONS

Steinbrener, J. et al., "Three-dimensional fluorescence imaging with an automated light-filed microscope", Progress in Biomedical Optics and Imaging, SPIE—International Society for Optical Engineering, 10883: 108831B-108831B (Feb. 2019).

Yu, J. et al., "Scam light field rendering", Proceedings. 10th Pacific Conference on Computer Graphics and Applications, 137-144 (Oct. 2002).

Taguchi, Y. et al., "Axial-cones: Modeling Spherical Catadioptric Cameras for Wide-Angle Light Field Rendering", ACM Siggraph Asia Papers, ACM Press, 1-8 (Dec. 2010).

Stolc, S. et al., "Depth and all-in-focus imaging by a multi-line-scan light-field camera", Journal of Electronic Imaging, 23(5): 053020-1-053020-19 (2014).

PCT International Preliminary Report on Patentability in International Patent Application No. PCT/IB2020/057552, dated Feb. 24, 2022, 8 pages.

\* cited by examiner

SAMPLE IMAGING VIA TWO-PASS LIGHT-FIELD RECONSTRUCTION

RELATED APPLICATION

This application is a National Stage Application of PCT/US2020/057552 filed on Aug. 11, 2020, which claims priority to U.S. provisional application No. 62/885,735 filed on Aug. 12, 2019, the contents of which is are incorporated herein by reference in their entireties. To the extent appropriate, a claim of priority is made to each of the above disclosed applications.

INTRODUCTION

Classical imaging acquires the position-dependent radiance of a scene using an image sensor configured as a focal plane array of photosensitive elements. The image sensor quantifies the incident radiance optically projected by a front lens (an objective), to capture a flattened spatial image of a scene lacking any directional information for the incident radiance. In contrast, light-field imaging preserves this directional information and extends a two-dimensional image into a four-dimensional light field describing the radiance of a scene with respect to position and direction.

Two different instrumentation approaches for light-field acquisition have been reported using either (i) an array of discrete cameras or (ii) a microlens array in front of an image sensor. For light-field microscopy, incorporation of a microlens array is often the preferred choice due to its lower cost and ability to be retrofitted easily to conventional microscopes.

The presence of a microlens array between a front lens and an image sensor forms a light-field image on an image sensor. The light-field image is composed of an array of discrete sub-images each corresponding to a different microlens of the microlens array. These sub-images describe the directional distribution of light for given points of a scene. This additional directional information generally enables several advantageous processing operations to obtain reconstructed "object-space" images after light-field acquisition: (i) perspective change of the point of view, (ii) digital re-focusing, (iii) artificially focusing selected objects in a scene, and (iv) matching-free 3D reconstruction.

Two light-field configurations with distinct properties can be defined, depending on the position of the microlens array relative to the objective and the image sensor of the imaging system. In the first configuration, dubbed "LF1.0," the microlens array lies in an intermediate image plane between the objective and the image sensor, and the image sensor lies in the back focal plane of the microlens array. In the second configuration, dubbed "LF2.0," these restrictions are removed and the microlens array can have an arbitrary location between the objective and the image sensor. Accordingly, in LF2.0 the location of the microlens array can be selected to optimize the desired performance criteria of the imaging system (e.g., lateral and axial resolution and depth of focus).

One of the most important applications of light-field imaging is 2D and 3D reconstruction of object space based on mapping 2D light-field data to object space. However, existing approaches for reconstructing object space from a light-field image are inadequate for various reasons. For example, the approaches may require iterative mapping and re-mapping, filtering to remove noise, and/or assumptions about the optical configuration, each of which may introduce reconstruction errors and/or cause reconstruction to fail outright. Moreover, user inspection of mapped light-field data may be necessary to select candidate reconstructions, which prevents full automation. New methods for sample imaging with a light-field imaging system are needed.

SUMMARY

The present disclosure provides methods and systems for sample imaging via two-pass light-field reconstruction. In an exemplary method, a light-field image of a sample may be captured in a light-field plane. The light-field image may be forward-projected computationally to each of a plurality of z-planes in object space to generate a set of forward-projected z-plane images. Backward-projection computationally to the light-field plane of the same xy-region in object space from each z-plane image may be compared with the light-field image, to determine a respective degree of correspondence between the backward-projected xy-region from each of the z-plane images and the light-field image. This comparison may be repeated for each of a plurality of different xy-regions in object space. For each different xy-region, at least one of the forward-projected z-plane images may be selected to contribute data for the different xy-region in a 2D or 3D object-space image of the sample. The object-space image incorporating the data may be generated.

DETAILED DESCRIPTION

Figure 1:
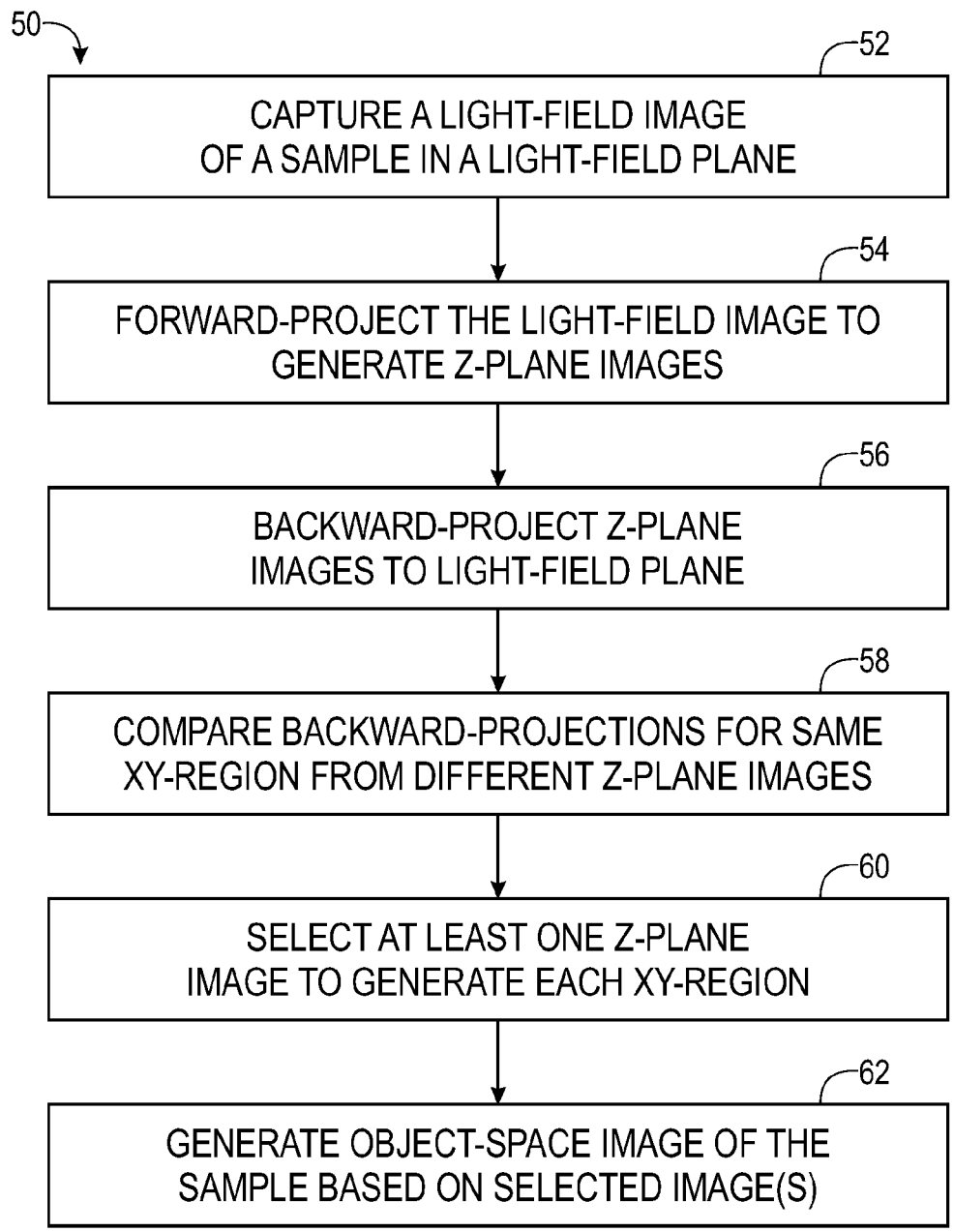
FIG. 1 is a flowchart of exemplary steps that may be performed in a method of sample imaging based on two-pass light-field reconstruction including a forward projection and a backward projection between light-field space and object space.

The present disclosure provides methods and systems for sample imaging via two-pass light-field reconstruction. In an exemplary method, a light-field image of a sample may be captured in a light-field plane. The light-field image may be forward-projected computationally to each of a plurality of z-planes in object space to generate a set of forward-projected z-plane images. Backward-projection computationally to the light-field plane of the same xy-region in object space from each z-plane image may be compared with the light-field image, to determine a respective degree of correspondence between the backward-projected xy-region from each of the z-plane images and the light-field image. This comparison may be repeated for each of a plurality of different xy-regions in object space. For each different xy-region, at least one of the forward-projected z-plane images may be selected to contribute data for the different xy-region in a 2D or 3D object-space image of the sample. The object-space image incorporating the data may be generated.

The methods of the present disclosure can be applied to light-field imaging configurations of type LF1.0 and LF2.0. For example, the methods apply to light-field imaging systems having non-telecentric geometries, where the magnification depends on the distance of each transverse object plane to the objective (i.e., the z-position of the object plane). The methods may utilize non-iterative forward and backward projections. Threshold-free forward projection may be performed on a light-field image to 3D object space using a geometric representation of the optical path (e.g., determined from a stack of calibration images) to obtain an initial z-estimate of object locations. The z-estimate of each object voxel (or pixel) may be refined using a computational backward-projection to light-field space and ranking the support for each z-hypothesis based on the patterns in covered sub-images of the light-field image.

The reconstruction of object space aligns with the spatial positions obtained with classical image stacks. However, the important advantage of an acquisition using a light-field setup and the described reconstruction is that the 3D volume including the spatial positions (x,y,z) of sample objects (e.g., beads or cells) can be obtained from a single light-field image. Thus, this method is much faster than acquiring a classical image stack by scanning the z-axis using an adjustable z-stage.

To be able to perform a quantitative reconstruction of three-dimensional object space (x,y,z) from a light-field image, the relationship between object space and two-dimensional light-field space needs to be known for each microlens subimage, $(x_k", y_k")$ of the light-field image. The mapping function is defined as $f: \vec{r} \rightarrow \vec{r}_k"$. In principle, the mapping function can be determined based on values for geometric parameters of the experimental setup, such as the relative distances of the cardinal planes of relevant optical elements to the image sensor. In practice, the exact location of these cardinal planes is unknown and the relative distances inside a light-field imaging system (e.g., a light-field microscope) cannot be easily determined to the required accuracy. This lack of precise geometric information is more problematic for LF2.0 configurations, where there are no well-defined optical criteria for the positioning of the microlens array inside the light-field imaging system (such as the intermediate image plane of the objective and the focal plane of the microlens array). In addition, optical effects of real lens systems (e.g., aberrations or errors caused by the lenses of the microlens array or other optical elements of the light-field imaging system) can lead to deviations in the actual optical geometry compared to the assumed optical geometry measured externally. Apart from these inherent difficulties in determining the relevant geometry from external measurements, user-induced changes to the geometry (e.g., due to refocusing or unintentional misalignment) can occur on a frequent basis. All deviations in the assumed geometry relative to the actual geometry will lead to errors in projection and reconstruction, resulting in incorrect depth information, loss of contrast, or a complete failure of the reconstruction.

The methods disclosed here may utilize a mapping function that relates three-dimensional object space to two-dimensional light-field space without detailed knowledge of the geometry of the optical layout. The mapping function may employ values for system parameters, such as total magnification and magnification due to the microlens array, over the entire range of z-positions of interest in object space, as described below in Example 1.

The methods disclosed herein can be used for all wavelength regimes where lens-based light-field systems are feasible. For example, the wavelength regimes can include optical radiation that is ultraviolet, visible, and/or infrared.

The methods and systems disclosed herein may enable rapidly determining the structure of three-dimensional cell clusters (e.g., spheroids, organoids) in screening applications. Currently, the throughput of these screening applications is limited by the time needed to acquire a z-series of images (generally more than ten images) at each site of interest. Throughput is limited even more if a confocal microscope is employed to image a three-dimensional volume at the site. In contrast, the methods and systems of the present disclosure can generate three-dimensional information about a cell cluster from a single light-field image.

Further aspects of the present disclosure are described in the following sections: (I) definitions, (II) method overview, (Ill) light-field imaging system, (IV) exemplary geometrical mapping function, and (V) selected aspects.

I. Definitions

Technical terms used in this disclosure have meanings that are commonly recognized by those skilled in the art. However, the following terms may be further defined as follows.

Computer—an electronic device for storing and processing data, typically in binary form, according to instructions, which may be provided by a variable program. Exemplary computers, also called computing devices, include desktop computers, laptop computers, tablets, smartphones, and the like.

Examination region—a volume intersected by an optical axis of a light-field imaging system in which objects of a sample can be locating for imaging with an image sensor.

Image—an optical or digital representation of an object(s) and/or field of view. The representation, if optical, may be formed by light at a plane in space (e.g., an intermediate image plane or a sensor plane) or on a surface (e.g., of an image sensor), among others. The representation, if digital, may be a raw light-field image captured by an image sensor, a processed form thereof, or a two-dimensional (pixel) or three-dimensional (voxel) "object-space" image.

Image sensor—an optical sensor capable of detecting spatial variations (e.g., variations in intensity) of light in two dimensions, where the light is incident on a photosensitive detection area of the sensor. The image sensor may be a two-dimensional array sensor, such as a charge-coupled device (CCD) sensor, an active pixel sensor (e.g., a complementary metal-oxide-semiconductor (CMOS) sensor), a hybrid CCD-CMOS sensor, or the like. The image sensor may create a raster image (i.e., a bitmap) as a rectangular array of pixels, and may be configured to acquire color images, grayscale (monochromatic) images, or both.

Lens array—a two-dimensional array of lenses. Exemplary lenses that may be suitable within the array for light-field microscopy are microlenses, namely, lenses each having a diameter of less than about one millimeter. Exemplary microlens diameters that may be suitable for a microlens array include less than about 750, 500, 400, 300, 200, or 100 micrometers, among others, for each microlens. Exemplary lens diameters for light-field macro photography include lenses having diameters of at least one millimeter, or in some cases, lenses that are microlenses as described above.

The lens array may have any suitable properties. The pitch (lens-to-lens spacing) of the array may (or may not) be similar to the lens diameter, such as no more than about 50%, 25%, 20%, or 10% greater than the lens diameter. The lenses may form a rectangular grid or hexagonal grid, among others. The array may contain any suitable number of lenses, generally at least four. In some embodiments, the array may contain at least 25, 50, or 100 lenses, among others. For example, the array may contain at least 2, 3, 4, 5, 6, 7, or 10 lenses along each of a pair of orthogonal axes defined by the array. The lenses of an array may be substantially identical to one another in size and/or shape, or may differ in size and/or shape. Furthermore, the array may be an integrated unit, and/or the lenses of the array may be formed integrally with one another.

Light—optical radiation, including ultraviolet radiation, visible radiation (i.e., visible light), and/or infrared radiation.

Light-field image—an optical image formed with light by a microlens array on an image sensor and composed of a two-dimensional array of subimages corresponding to microlenses of the array, or a captured (digital) form thereof. The subimages generally do not overlap one another significantly, if at all. The subimages may or may not be substantially in focus.

Light source—a device that generates light, optionally as a beam of light, and optionally powered by electricity. A light source includes at least one light-emitting element and also may include any associated optical element(s) to shape, size, filter, polarize, scatter, direct, and/or otherwise interact with light emitted by the light-emitting element(s). These optical elements may include any combination of at least one waveguide (e.g., a fiber optic or liquid light guide), lens, mirror, filter, diffuser, mask, aperture, beam-splitter, grating, prism, polarizer, and/or the like. Exemplary light-emitting elements include a semiconductor device, laser (e.g., excimer laser, gas laser, dye laser, solid-state laser, semiconductor crystal or diode laser, free electron laser, etc.), arc lamp, and/or the like. Exemplary semiconductor light-emitting elements include laser diodes, light-emitting diodes (LEDs), and superluminescent diodes, among others.

Object-space image—a 2D or 3D image representing a region of physical space (i.e., object space) and reconstructed from at least one light-field image.

Objective—a single optical element or a combination of optical elements that gathers light from an object(s) and/or field of view and focuses the gathered light. The objective, as used herein, may include each optical element located along the optical axis between an examination region and a lens array of a light-field imaging system.

Optics—a set of optical elements of an imaging system, which may be arranged along an optical path between a light source and an examination region (illumination optics) and/or along an optical axis between the examination region and an image sensor (collection optics). An optical element may be any device or structure that interacts with light, such as to collect, direct, focus, filter, polarize, scatter, collimate, and/or partially block light. An optical element may function by any suitable mechanism, such as reflection, refraction, scattering, diffraction, absorption, and/or filtering, among others. Exemplary optical elements include lenses, mirrors, diffusers, gratings, prisms, filters, apertures, masks, beam-splitters, waveguides, polarizers, and the like.

Sample—a specimen having any suitable properties. The sample may be organic and/or inorganic, natural and/or manufactured, and may include any suitable assembly, material, substance, isolate, extract, particles, or the like. In exemplary embodiments, the sample includes biological cells (such as isolated cells or one or more clusters of cells). The biological cells may be eukaryotic (e.g., mammalian cells) or prokaryotic (e.g., bacterial cells). Exemplary biological cells include established cells (cell lines), primary cells, cells of a tissue sample, transfected cells, cells from a clinical sample (e.g., a blood sample, a fluid aspirate, a tissue section, etc.), clones of cells, and/or the like. The cells may be contained by a sample holder, optionally in contact with (e.g., immersed in) any suitable liquid medium. The liquid medium may be an aqueous medium, which may include water, salt, buffer, glucose, detergent, dye, protein, amino acids, or any combination thereof, among others. The liquid medium may be a growth medium for the cells.

Sample holder—a device for holding at least one sample or any array of spatially isolated samples, and optionally permitting the sample(s) to be imaged through a horizontal, transparent wall of the device (e.g., the bottom wall of a well). Exemplary sample holders for light-field microscopy include (multi-well) microplates, culture dishes, culture flasks, slides, flow chips, etc.

z-position—one of the locations along an optical axis of a light-field imaging system at which an object can be disposed. The z-position can be defined as the distance between the object and an objective of the light-field imaging system, measured parallel to the optical axis, and can be changed by moving the object or the objective parallel to the optical axis.

II. Method Overview

This section provides an overview of an exemplary method 50 of sample imaging using two-pass light-field reconstruction; see FIGS. 1-5. The two-pass light-field reconstruction includes a forward projection of a light-field image computationally from a light-field plane to z-planes of object space and backward projection computationally from each z-plane to the light-field plane.

Method 50 may be performed with any light-field imaging system for which the mapping geometry between object space and light-field space is known. More specifically, the mapping geometry may be characterized sufficiently, prior to performance of method 50, to permit two-pass mapping in opposite directions between object space and light-field space. Pixels of a two-dimensional light-field image, captured in a light-field plane defined by the imaging system, can be mapped (i.e., forward-projected via data processing performed with a mapping function) to pixels/voxels in object space. In turn, pixels/voxels of a two-dimensional or three-dimensional object-space image can be mapped (i.e., backward-projected via data processing performed with the mapping function) to the light-field plane.

The mapping geometry may be characterized by any suitable procedure. In some examples, the mapping geometry may be defined using a calibration target. Exemplary calibration targets and their use to determine a mapping geometry based on a total magnification and microlens magnification of a light-field imaging system as described in Section IV. In other examples, the mapping geometry may be determined from knowledge of the explicit configuration of the system's optics (such as the types of optical elements in the system, their optical parameters, and their relative distances from one another). In yet other examples, the mapping geometry may be extracted via one or more iterative optimization processes to determine the free parameters of an optical model for the imaging system.

Method 50 itself may be performed non-iteratively and without thresholding. Mapping to object space from light-field space may be performed in a first pass, and then back to light-field space in a second pass. No iterations of the first and second passes are needed. Moreover, mapping may be performed without applying any threshold to filter out noise.

FIG. 1 shows exemplary steps that may be performed in method 50. The steps, indicated at 52, 54, 56, 58, 60, and 62, may be performed in any suitable order and combination, and may be modified as described elsewhere herein. Illustrative aspects of method 50 are shown schematically in FIGS. 2-5.

Figure 2:
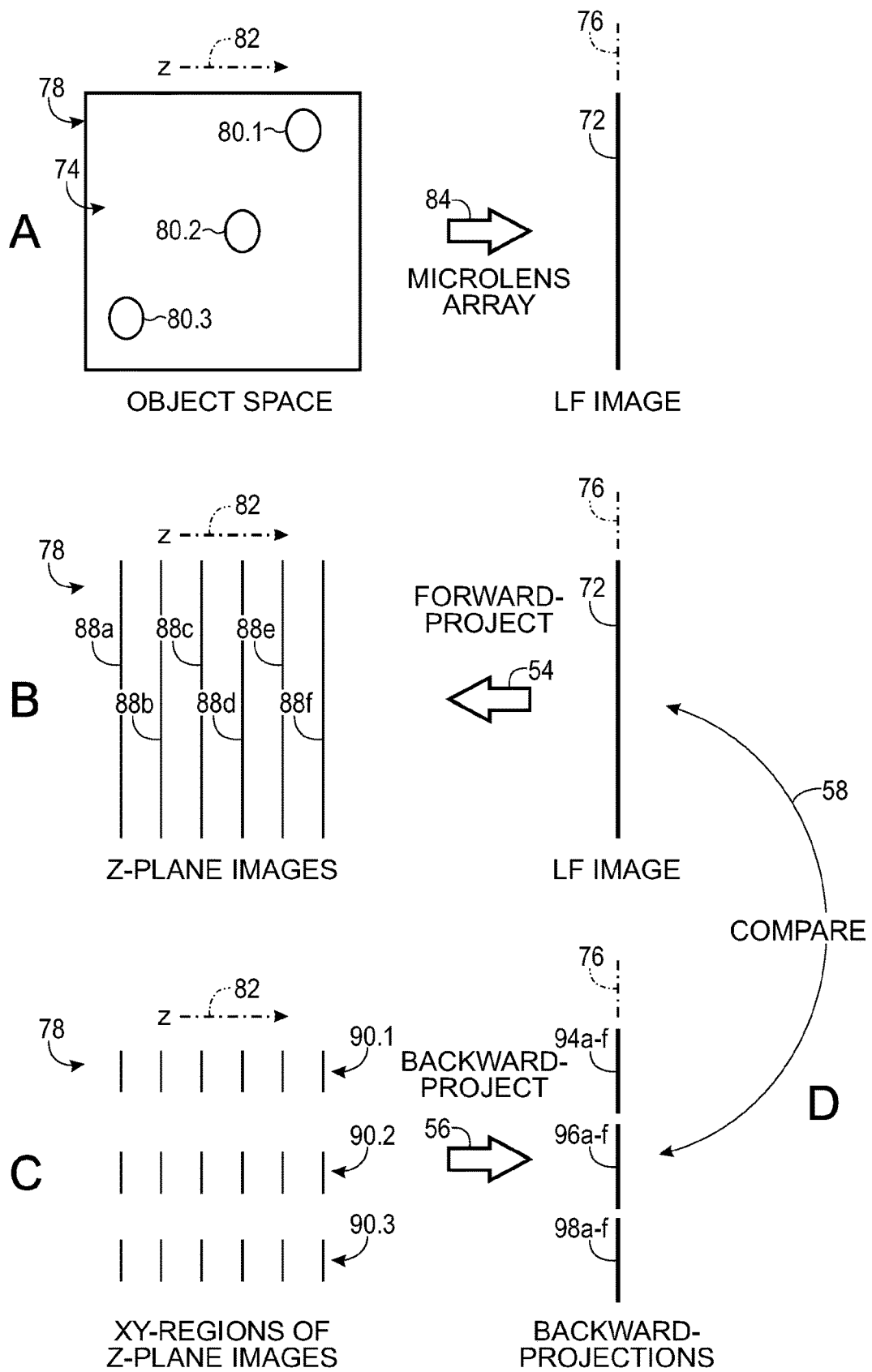
FIG. 2 is a schematic illustration of several of the steps from the flowchart of FIG. 1.

A light-field image 72 of a sample 74 may be captured in a light-field plane 76, indicated at 52 in method 50 (see FIGS. 1 and 2 (panel A)). Sample 74 is located in three-dimensional object space 78 and may include one or more discrete objects 80.1, 80.2, and 80.3, which may be microscopic objects, such as cells or beads, among others. Each object 80.1 to 80.3 has a position with respect to x, y, and z axes in object space 78. The z-axis is typically parallel to the optical axis for imaging, and may be the same as the optical axis. In object space 78 of FIG. 2, z-axis 82 is shown as horizontal, the x-axis is vertical, and the y-axis is orthogonal to the plane of the drawing. Spaced planes each oriented orthogonal to the z-axis are described herein as z-planes.

Light-field image 72 may be formed by propagating light from sample 74 through a microlens array, indicated by an arrow at 84 in FIG. 2, panel A. Light incident on light-field plane 76 is detected by an image sensor, which results in capture of the light-field image.

Light-field image 72 may be forward-projected computationally from light-field plane 76 into object space 78 to generate forward-projected images 88a-f, also called z-plane images, indicated at 54 in method 50 (see FIGS. 1 and 2 (panel B)).

The forward projection may be performed in any suitable way. For example, each point in light-field space (i.e., each point of the light-field image) may be forward-projected to object space using a mapping geometry function (e.g., see Section IV). As another example, the entire light-field image may be forward-projected at once using a precomputed look-up table connecting light-field space with object space. As still another example, the entire light-field image may be forward-projected at once using a derived system matrix connecting light-field space with object space (represented as a two-dimensional or higher-dimensional matrix).

Two, three, four, or more z-plane images may be generated, each representing forward-projection to a different z-plane in object space 78. Each z-plane image 88a-f is composed of xy-regions, each corresponding to a pixel, a group of pixels, or an object, among others. The z-plane images 88a-f may or may not be uniformly spaced from one another along z-axis 82.

Z-plane images 88a-f, or at least corresponding xy-regions thereof (e.g., xy-regions 90.1, 90.2, and 90.3) of each z-plane image, may be backward-projected computationally to light-field plane 76 to create sets of backward projections 94a-f, 96a-f, and 98a-f, indicated at 56 in method 50 (see FIGS. 1 and 2 (panel C)). Members of each set of backward projections 94a-f, 96a-f, or 98a-f represent the same xy-region within object space 78 but different z-planes. The xy-regions 90.1, 90.2, and 90.3 depicted in FIG. 2 (panel C) correspond respectively to z-candidates (i.e., z-position estimates) for objects 80.1, 80.2, and 80.3 (see FIG. 2 (panel A)). In other examples, these xy-regions may correspond to single pixels or groups of pixels, among others, of z-plane images 88a-f.

Members of each set of backward projections 94a-f, 96a-f, and 98a-f may be compared to light-field image 72, indicated at 58 in method 50 (see FIGS. 1 and 2 (panel D)). This comparison measures the degree of correspondence between each member of a given backward-projection set (94a-f, 96a-f, or 98a-f) and light-field image 72. A higher degree of correspondence for a given member of a backward-projection set makes the xy-region of the progenitor z-plane image for the given member a better candidate for that same region of an object-space image to be constructed.

At least one z-plane image may be selected for generating each of the xy-regions in an outputted object-space image (e.g., a displayed object-space image), and corresponding regions of the object-space image may be generated using the z-plane image(s) selected, indicated at 60 and 62 in method 50 (see FIG. 1). For example, each of one or more of the xy-regions of the object-space image may be generated directly using the corresponding xy-region from a single z-plane image. Alternatively, or in addition, each of one or more of the xy-regions of the object-space image may be generated using the same xy-region from two or more z-plane images, such as by averaging, interpolation, maximum intensity operations, or the like, based on a degree of correspondence measured for the same xy-region for different z-plane images.

The object-space image generated may be a two-dimensional (2D) or a three-dimensional (3D) image. If a 2D image, the 2D image may be a substantially all-in-focus 2D image composed of pixels. If a 3D image, the 3D image may be composed of voxels.

Figure 3:
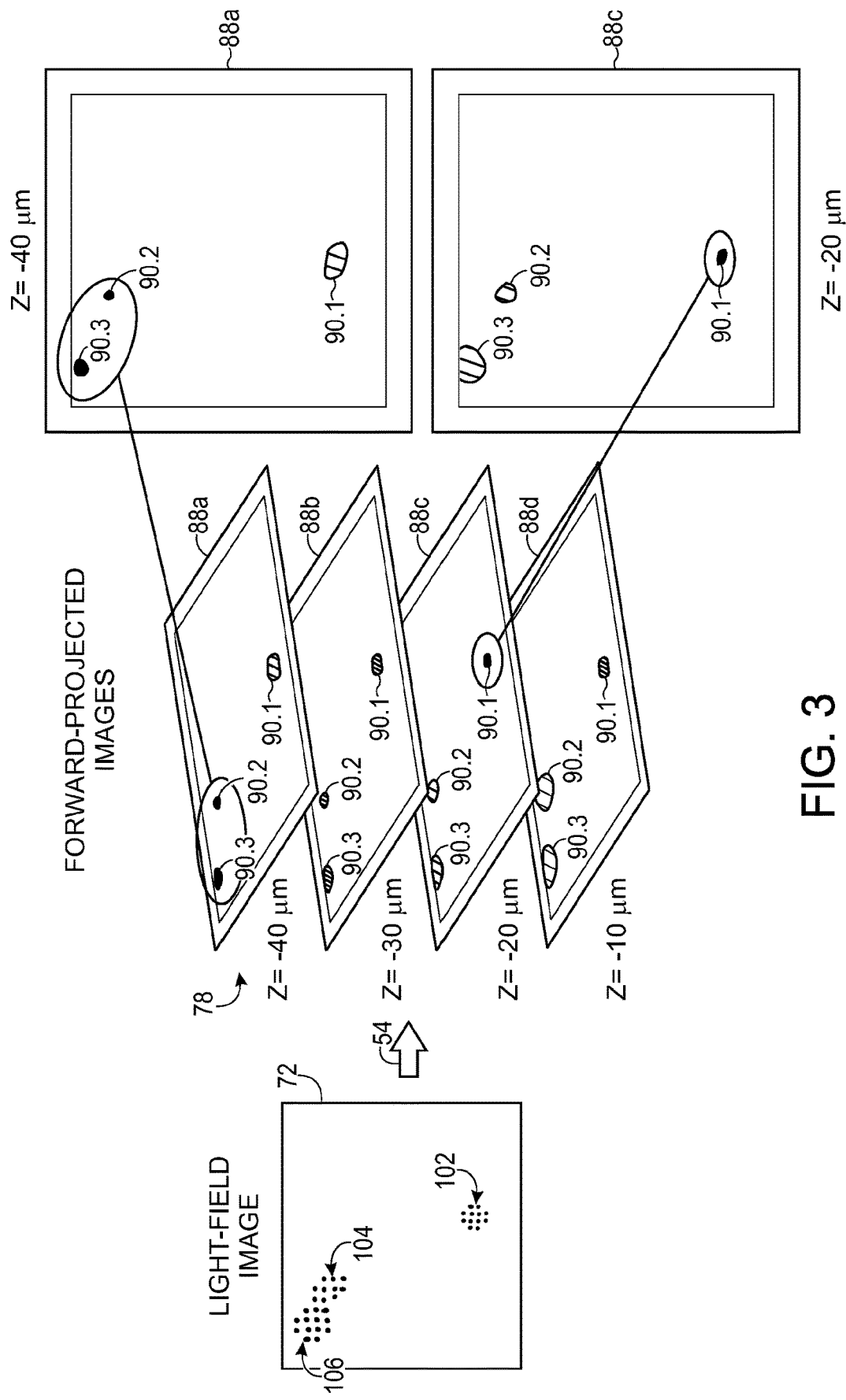
FIG. 3 is a simplified illustration of forward projection of an exemplary light-field image of three objects (beads) into a plurality of z-planes in object space to create forward-projected, z-plane images.

FIG. 3 shows a simplified illustration of forward-projection of an exemplary light-field image 72 of three objects 80.1-80.3 (e.g., fluorescent beads) to four z-planes in object space 78 (also see FIG. 2). In this example, the z-planes are located at respective z-positions: −40, −30, −20, and −10 micrometers (μm). Each of the z-plane images 88a-88d produced by forward-projection of light-field image 72 contains xy-regions 90.1, 90.2, and 90.3. The contents of these xy-regions in respective z-plane images 88a-88d are candidate counterparts, in object space 78, of light-field representations 102, 104, and 106 of objects 80.1-80.3 in light-field image 72.

The degree of focus for each xy-region 90.1-90.3 in each image 88a-88d is indicated by a solid fill or hatching. The presence of a solid fill for a given xy-region in a given z-plane means that the given xy-region is substantially in-focus in that z-plane. The presence of hatching indicates that the given xy-region is less focused in that z-plane than a solid fill for the same xy-region in a different z-plane. A lesser spacing of hatch lines for a given xy-region in a given z-plane means a better focus than a greater spacing of hatch lines for the same xy-region in a different z-plane. Accordingly, xy-region 90.1 (for object 80.1) has a best focus in forward-projected image 88c at −20 μm, while xy-regions 90.2 and 90.3 (for objects 80.2 and 80.3) have a best focus in forward-projected image 88a at −40 μm.

Figure 4:
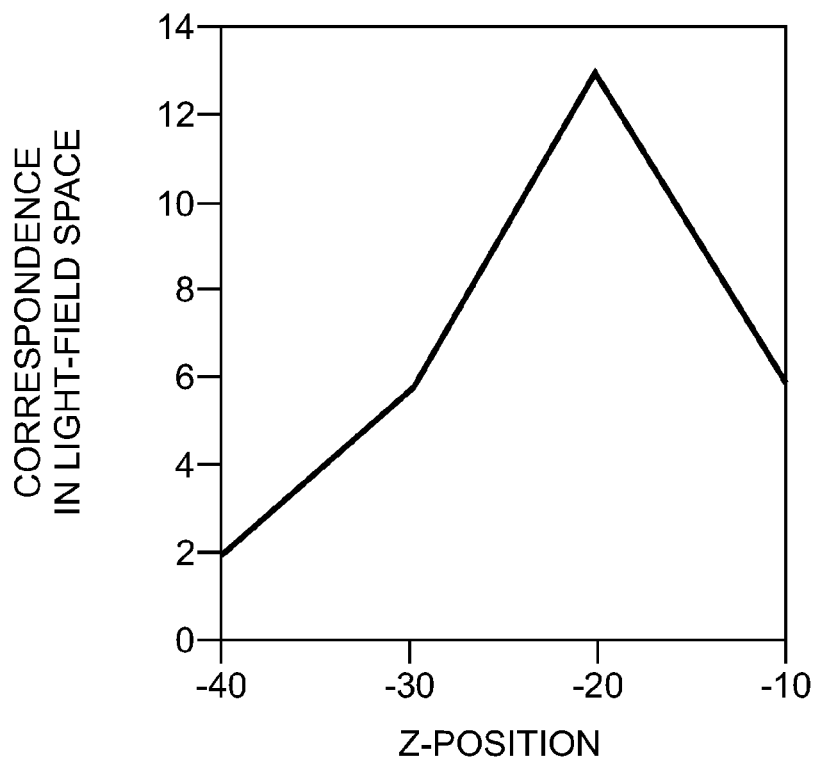
FIGS. 4 and 5 are exemplary graphs that may be obtained by plotting, as a function of z-position, the degree of correspondence between the light-field image of FIG. 3 and backward projections of two respective bead-depicting groups of pixels from each of the forward-projected, z-plane images of FIG. 3.
Figure 5:
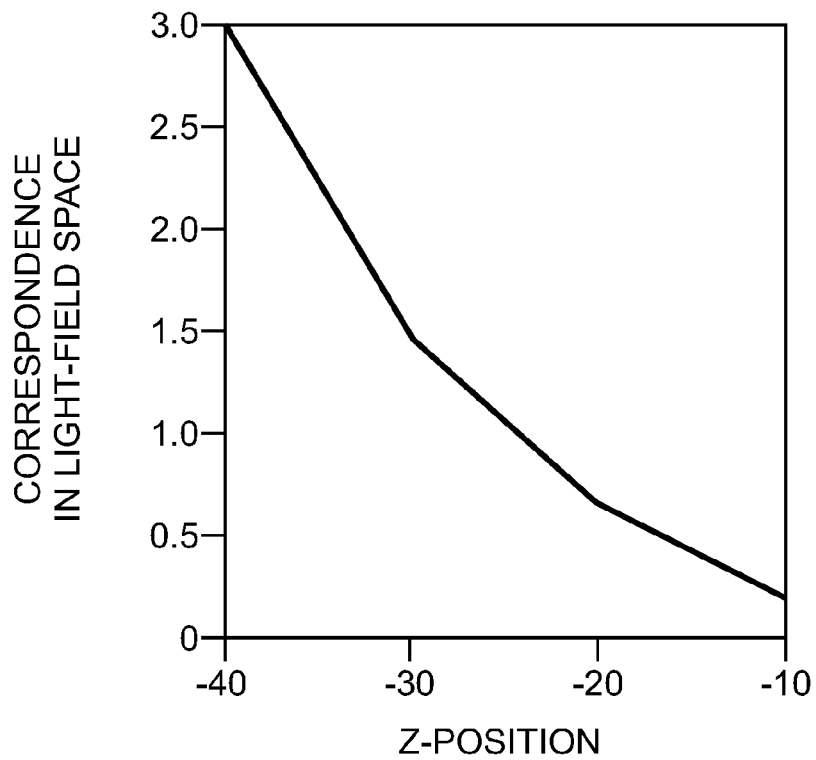

The degree of focus for each xy-region 90.1-90.3 in each z-plane can be estimated by backward-projection of the xy-region to the light-field plane of light-field image 72 and comparison of each backward-projection with the light-field image. FIGS. 4 and 5 show graphs illustrating an exemplary comparison for each xy-region 90.1 (FIG. 4) and each xy-region 90.2 (FIG. 5) of FIG. 3. The graphs plot the degree of correspondence with light-field image 72 for each backward-projected xy-region 90.1 or 90.2 according to z-position. Consistent with the degree of focus visible in FIG. 3, backward-projection of xy-region 90.1 from forward-projected image 88c (−20 μm) shows the greatest degree of correspondence with light-field image 72 relative to other z-positions tested (see FIG. 4). Also, backward-projection of xy-region 90.2 from forward-projected image 88a (−40 μm) shows the greatest degree of correspondence with light-field image 72 relative to other z-positions tested (see FIG. 5). Accordingly, a 2D or 3D object-space image can be generated using a greater or exclusive contribution of data from image 88c for xy-region 90.1 and from image 88a for xy-region 90.2 based the degrees of correspondence measured.

Any combination of the steps of FIG. 1, or other methods disclosed herein, may be embodied as a computer method, computer system, or computer program product. Accordingly, aspects of the method may take the form of an entirely hardware example, an entirely software example (including firmware, resident software, micro-code, and the like), or an example combining software and hardware aspects, all of which may generally be referred to herein as a "circuit," "module," or "system." Furthermore, aspects of the method may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, any suitable combination of these, and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, and/or any suitable combination of these, among others.

Computer program code for carrying out operations for aspects of the methods disclosed herein may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the methods are described herein with reference to flowchart illustrations and/or block diagrams of methods, apparatus, systems, and/or computer program products. Each block and/or combination of blocks in a flowchart and/or block diagram may be implemented by computer program instructions. The computer program instructions may be provided to a processor of a general-purpose computer, special purpose computer, or other programmable data processing apparatus to produce a machine, such that the instructions, which execute via the processor of the computer or other programmable data processing apparatus, implement the functions/acts specified in the flowchart and/or block diagram block(s). In some examples, machine-readable instructions may be programmed onto a programmable logic device, such as a field programmable gate array (FPGA).

The computer program instructions can also be stored in a computer-readable medium that can direct a computer to function in a particular manner, such that the instructions stored in the computer-readable medium produce an article of manufacture including instructions which implement the functions/acts specified in the flowchart and/or block diagram block(s).

The computer program instructions can also be loaded onto a computer to cause a series of operational steps to be performed on the device to produce a computer-implemented process such that the instructions which execute on the computer provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the methods disclosed herein. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

III. Light-Field Imaging System

This section describes an exemplary light-field imaging system 110 for performing the methods of Section II; see FIGS. 6-10.

Light-field imaging system 110 may include a light-field microscope 112 (or a light-field camera for light-field macro photography) having a stage 114 to support objects of interest. Here, a sample holder 116 is supported by stage 114. Sample holder 116 may, for example, be a microplate 118 having a plurality of wells 120 each containing a sample 122, which may include biological cells 124. A drive mechanism 126 may move stage 114 and sample holder 116 relative to one another to place each well 120 on an optical axis 128 of system 110.

Optical axis 128 may be defined in an examination region 130 of object space 78 by an objective 132. An object plane 134 (a z-plane) in object space 78 is orthogonal to optical axis 128 (a z-axis) when sample holder 116 is operatively supported by stage 114, and which may be located near a front focal plane of objective 132.

Sample 122 may be illuminated with optical radiation (e.g., visible light) generated by a light source 138. Illumination of sample 122 may, for example, induce photoluminescence (such as fluorescence) from at least one photoluminophore therein. The photoluminescence may, for example, propagate through objective 132, an optional tube lens 140, and a microlens array 142. Microlens array 142 may have any suitable number of microlenses 144 arranged in a two-dimensional array. Individual microlenses 144 of microlens array 142 may at least partially focus the photoluminescence onto an image sensor 146, to form individual subimages each corresponding to a different one of the microlenses 144. Image sensor 146 captures a light-field image of the subimages, which is communicated to a computer 148 for data processing. In other embodiments (e.g., for light-field macro photography), microlens array 142 may be replaced by a lens array composed of lenses that are not necessarily microlenses. In other embodiments, sample 122 may transmit, reflect, or otherwise interact with incident optical radiation that forms the light-field image.

Light-field microscope 112 permits adjustment of the z-position of sample 122 along optical axis 128 via drive mechanism 126. More specifically, the drive mechanism can operate to change the distance between sample 122 and objective 132 along optical axis 128. Accordingly, drive mechanism 126 may be coupled to stage 114, as shown in FIG. 1, to drive movement (e.g., vertical movement) of the stage while the z-position (e.g., the elevation) of objective 132 remains fixed. Alternatively, drive mechanism 126 may be coupled to objective 132, to drive movement (e.g., vertical movement) of objective 132 while the z-position (e.g., the elevation) of stage 114 remains fixed. Drive mechanism 126 may include a motor 150 (or may be driven manually), and may be controlled by computer 148.

Optical axis 128 may have any suitable orientation and properties. The optical axis is typically vertical at objective 132, and may extend vertically upward (as shown here) or vertically downward through examination region 130 and object plane 134 from objective 132. In other words, light-field microscope 112 may have an inverted configuration, with objective 132 below examination region 130, as shown here, or a non-inverted configuration, with objective 132 above examination region 130. However, in other embodiments, optical axis 128 may be horizontal or oblique (neither substantially horizontal nor substantially vertical) at objective 132. Optical axis 128 may be non-folded, or may be folded (e.g., with a mirror) at one or more sites along the optical axis.

Light source 138 may be arranged to provide any suitable illumination of examination region 130 (and sample 122 therein) with any suitable light source (e.g., see Section I). The illumination may be epi-illumination (as shown here), trans-illumination, oblique illumination, or a combination thereof, among others. Any suitable optical element(s) may be operatively positioned on an illumination path between light source 138 and examination region 130, to direct and/or condition optical radiation generated by the light source upstream of the examination region. Exemplary optical elements located in the illumination path may include a beam-splitter 152, a diffuser, a spectral filter, a collimating lens or mirror, a fold mirror, a light guide, and/or the like. Optical radiation from sample 122 may be collected by objective 132 for propagation through the objective, beam-splitter 152, tube lens 140, and microlens array 142 for detection by image sensor 146.

Computer 148 is in communication with image sensor 146, and processes light-field images captured by image sensor 146. Computer 148 may include a processor 156 to process instructions, memory 158 to store the instructions and data, and a user interface 160 for communication between computer 148 and a user. The user interface may include a user input device, such as a keyboard, mouse, or touchscreen, and a display device, such as a monitor.

Figure 7:
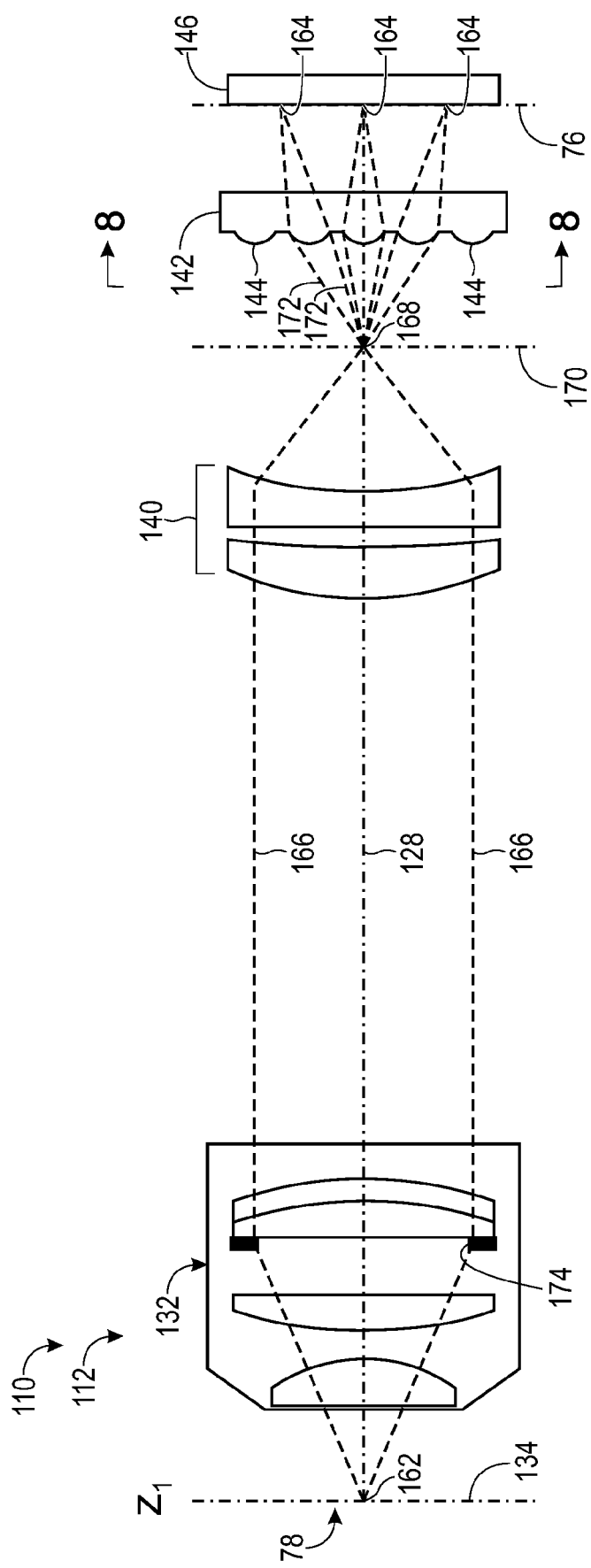
FIG. 7 is a ray diagram created with selected components of the light-field microscope of FIG. 6 and illustrating propagation of exemplary light rays from a point object located in a plane of object space, to a sensor plane (i.e., a light-field plane) in two-dimensional light-field space.

FIG. 7 shows a ray diagram with only selected components of light-field microscope 112. The diagram depicts how optical radiation may propagate from an object point 162 in object plane 134 of object space 78 to a plurality of separate light-field image points 164 on image sensor 146. The optical radiation is represented by upstream marginal rays 166 extending from object point 162 to an intermediate point 168 in an intermediate image plane 170, and downstream marginal rays 172 extending from intermediate point 168 to a light-field plane 76 defined by image sensor 146. In this exemplary configuration, object plane 134, intermediate image plane 170, and light-field plane 76 are conjugate with one another, such that optical radiation is focused precisely to light-field image points 164.

Figure 8:
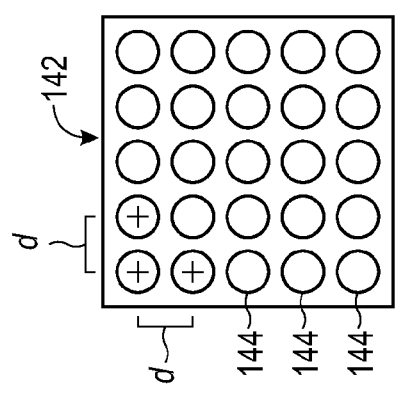
FIG. 8 is a front view of an exemplary microlens array for the light-field microscope of FIG. 7, taken generally along line 8-8 of FIG. 7.
Figure 9:
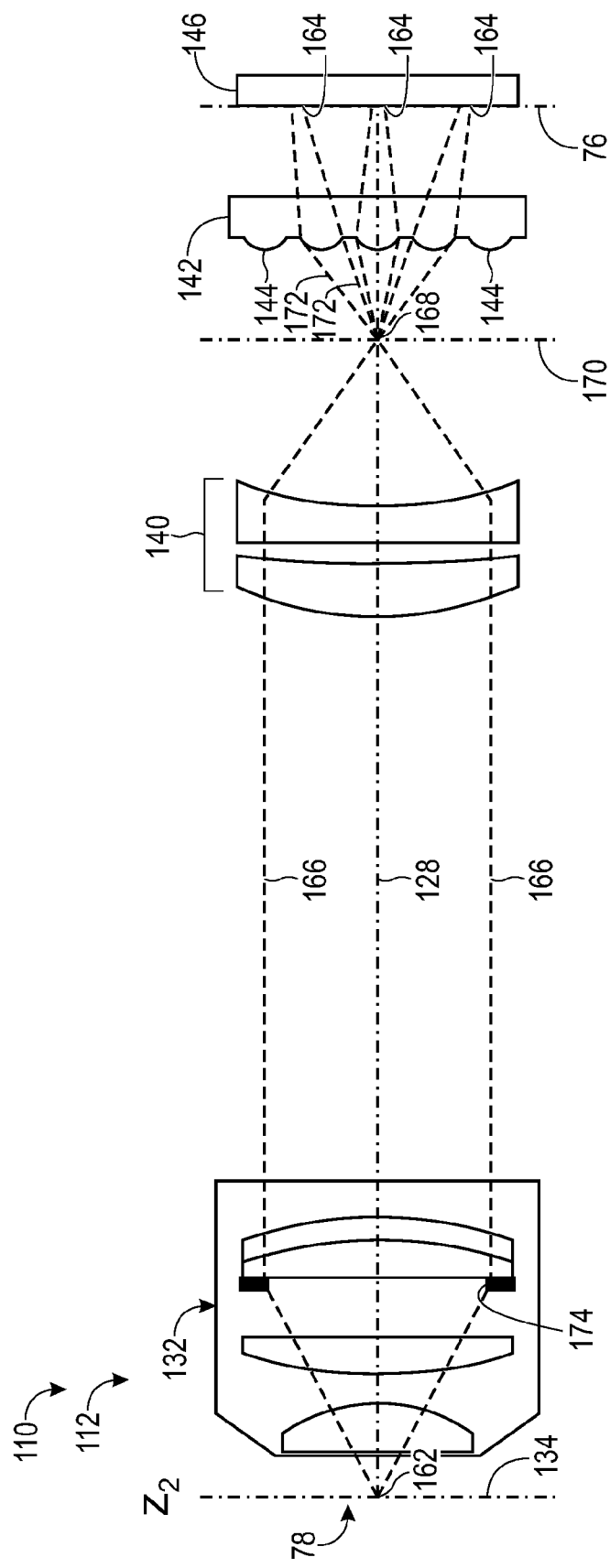
FIG. 9 is a ray diagram similar to the ray diagram of FIG. 7, except with the object plane having a z-position closer to an objective of the light-field microscope.
Figure 10:
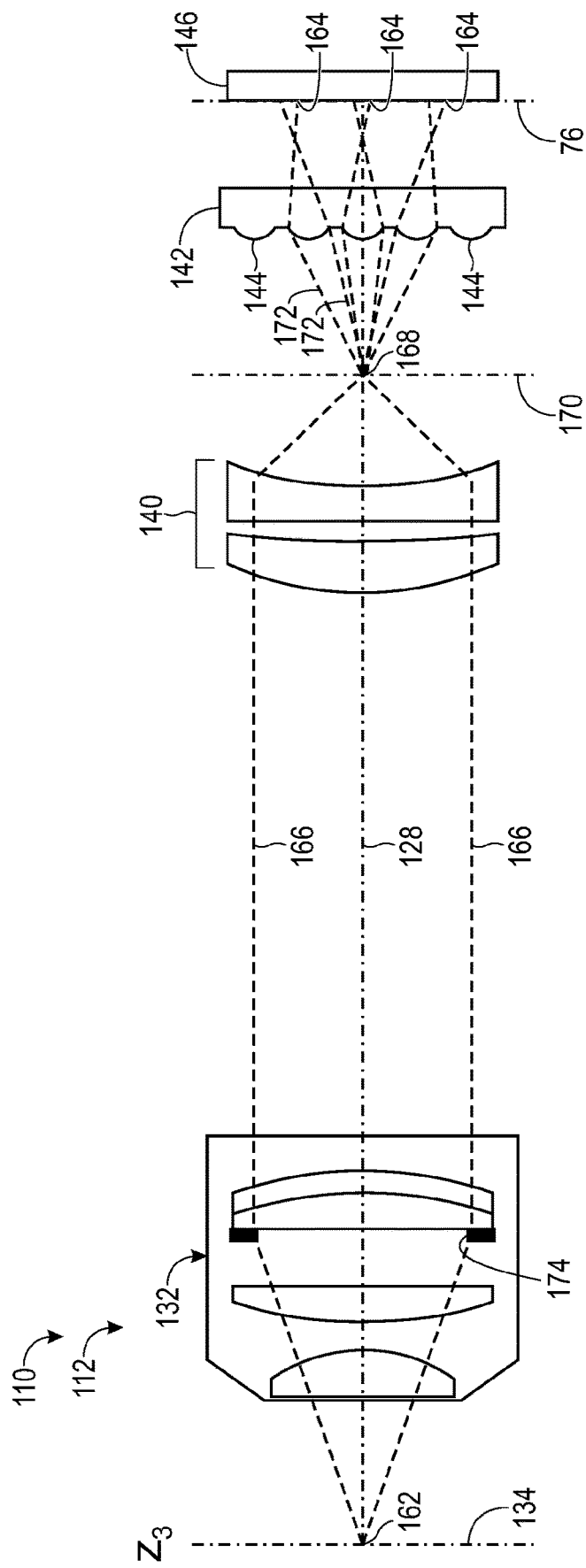
FIG. 10 is another ray diagram similar to the ray diagram of FIG. 7, except with the object plane having a z-position farther from the objective of the light-field microscope.

A plan view of an exemplary microlens array 142 is shown in FIG. 8. Microlenses 144 may be arranged in a two-dimensional array. The microlenses may be distributed along a pair of orthogonal axes in the plane of the array to define a rectangular grid, as shown, although a non-rectangular arrangement of microlenses may be used instead. In some embodiments, microlenses 144 may be uniformly spaced from one another along each orthogonal axis of the pair of axes, and optionally may have the same spacing from one another, pitch d, along both axes, as shown.

The distance between light-field image points 164 may be greater than the spacing of microlenses 144 (e.g., pitch d in FIG. 8) due to parallax (see FIG. 7). Optical radiation from intermediate point 168 may be incident on at least a subset of individual microlenses 144 of microlens array 142 at a different angle for each microlens. In other words, each chief ray propagating from intermediate point 168 through each microlens 144 of the subset has a different orientation. The optical radiation from intermediate point 168 may be incident on only a subset of the microlenses of microlens array 142, as shown, because the cone size of optical radiation propagating from intermediate point 168 may be limited by an aperture (e.g., stop element 174) located upstream (e.g., in objective 132). (However, light-field microscope 112 generally has a non-telecentric optical configuration, such that magnification varies with the distance from objective 132.) As object point 162 is moved sufficiently laterally in object plane 134, a different subset of the microlenses may receive optical radiation from object point 162. Accordingly, a set of sufficiently spaced object points 162 in object plane 134 may be imaged by different subsets of the microlenses, and may have conjugate points/spots in different subsets of subimages in a light-field image captured by image sensor 146.

In other cases, the distance between light-field image points 164 may be less than the physical spacing of microlenses 144 (e.g., pitch d in FIG. 8). For example, in a hypercentric, Galileo-type setup, the pitch of the optically projected images of the microlens on the image sensor may be smaller than the physical pitch of the microlens array. Likewise, in this setup, the distance between light-field image points 164 is smaller than the (optically projected and physical) pitch of the microlens array.

Light-field microscope 112 shown in FIG. 7 collimates optical radiation upstream with an infinity-corrected objective 132, and focuses the collimated radiation with a downstream tube lens 140. In other embodiments, tube lens 140 may be eliminated, and the optical radiation may, for example, be both collected and focused with objective 132.

FIG. 7 shows object plane 134 located at z-position $z_1$, which is precisely conjugate to light-field plane 76. However, this precise relationship for the location of an object is not required. More particularly, light-field images suitable for the methods of the present disclosure may be captured by image sensor 146 for an object plane 134 located closer to objective 132 at z-position $z_2$, and farther from objective 132 at z-position $z_3$ (see FIGS. 9 and 10, respectively). In either case, optical radiation from intermediate point 168 is less focused at light-field plane 76 than in FIG. 7, such that image points 164 of FIG. 7 become larger image spots in FIGS. 9 and 10.

Further exemplary aspects of light-field imaging system 110 and light-field microscope 112 (or a light-field macro photography system) that may be suitable are described elsewhere herein, such as in Sections I, II, IV, and V.

IV. Exemplary Geometrical Mapping Function

Figure 11:
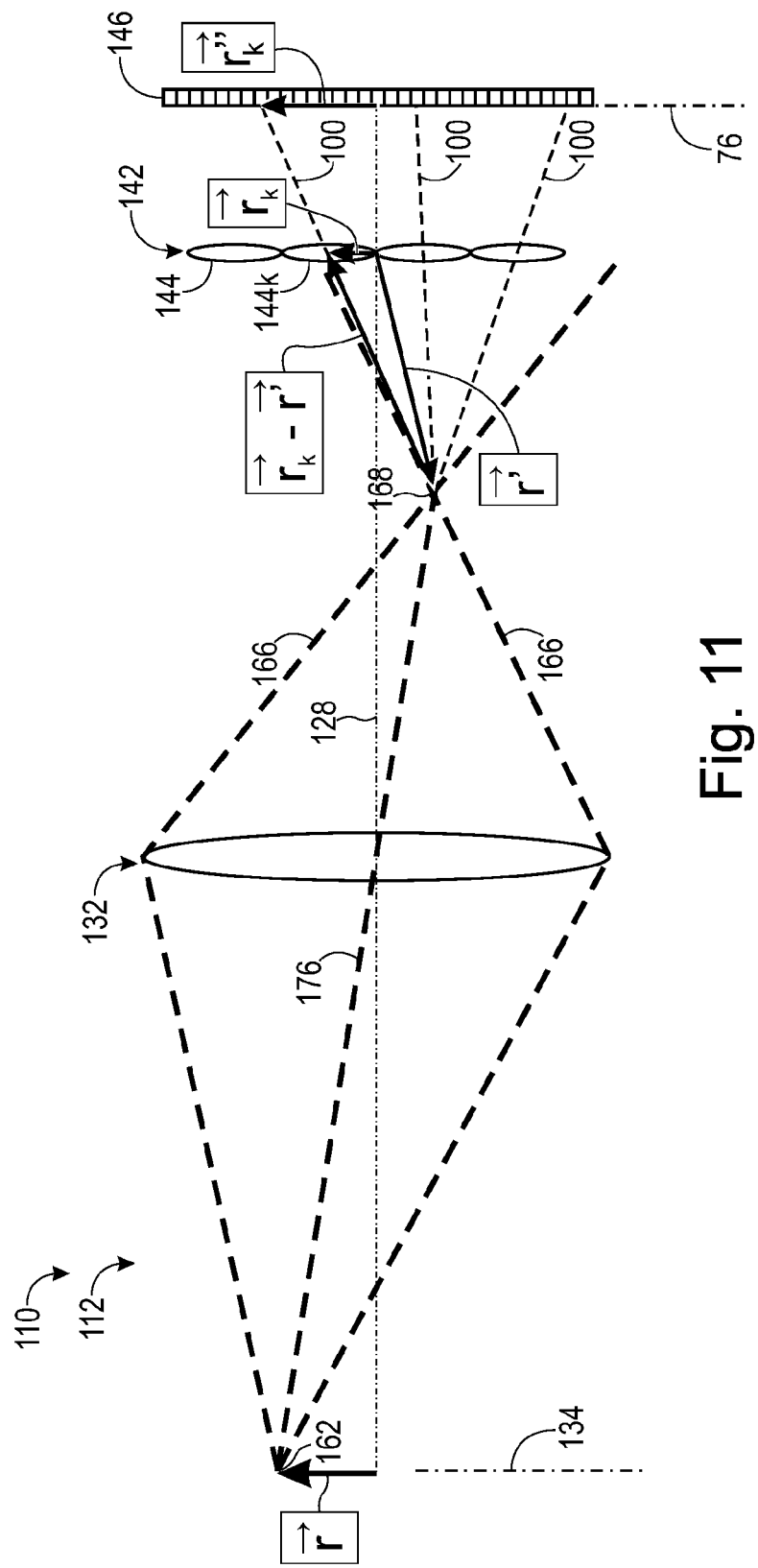
FIG. 11 is a schematic view of a light-field microscope and illustrating with representative rays the imaging of a real inverted image using a microlens array, and also illustrating the basis for a mapping function that relates a point in object space to a plurality of points in light-field space.
Figure 12:
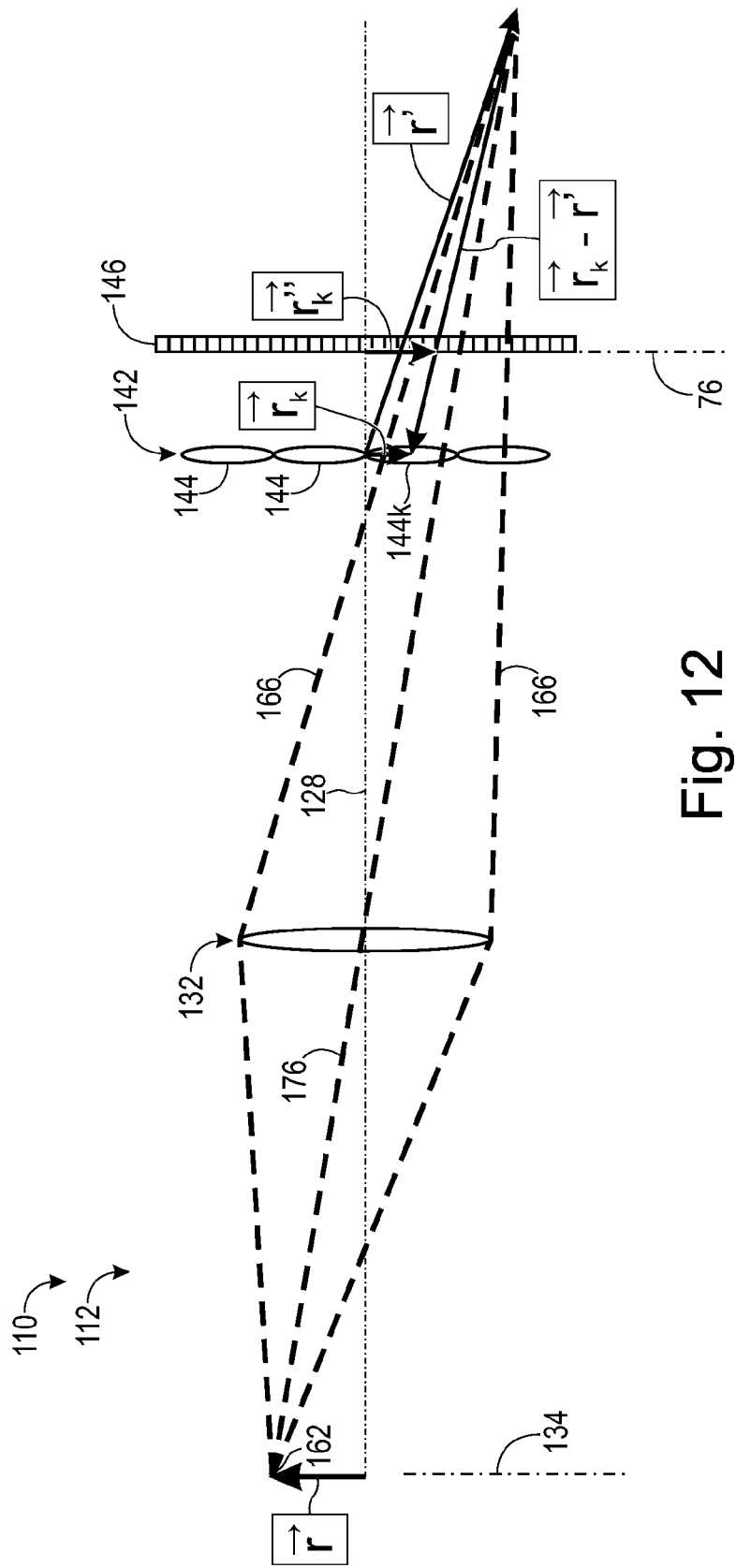
FIG. 12 is another schematic view of a light-field microscope and illustrating with representative rays the imaging of a virtual inverted imaged using a microlens array, and also illustrating the basis for a mapping function that relates a point in object space to a plurality of points in light-field space.

This section describes the basis for an illustrative geometrical mapping function for use in method 50; see FIGS. 1, 11, and 12. The mapping function relates object space and light-field space to one another for an object plane at a given z-position along the optical axis. The mapping function may be used with a light-field microscope or a light-field macro photography system, among others.

Figure 6:
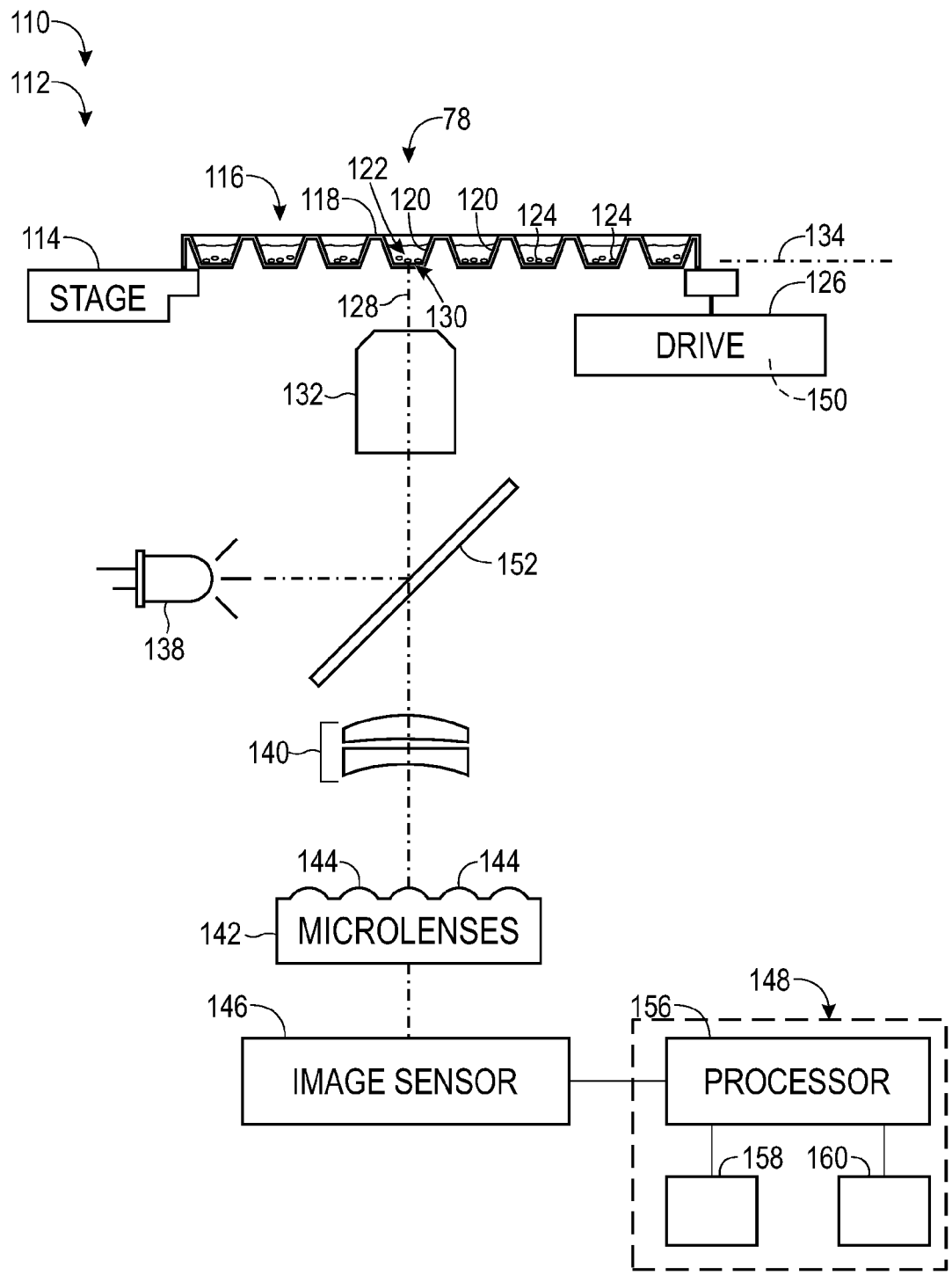
FIG. 6 is a schematic view of an exemplary light-field imaging system including a light-field microscope supporting a microplate holding an array of cell-containing samples in wells.

Light-field microscope 112 of FIGS. 11 and 12 may be constructed as in FIGS. 6 and 7 but is depicted in a somewhat different form. Objective 132 is shown as a single lens and microlens array 142 is shown in a more stylized form. These simplifications emphasize that, except for the relevant parameters described below, the objective and microlenses can have a "black box" construction otherwise. Moreover, one of microlenses 144, which has been selected to illustrate mapping, has been labeled as the k-th microlens, "144k." Object point 162 is located in object plane 134 as in FIGS. 7, 9, and 10, but is laterally offset from optical axis 128 (compare with FIG. 7). Marginal rays 166 and a chief ray 176 extend from object point 162, through objective 132, to intermediate point 168 in FIG. 11. The marginal rays are shown extending downstream of intermediate point 168, to indicate boundaries of the cone of optical radiation incident on microlens array 142 from object point 162. Upstream chief ray 176 is shown as ending prematurely at intermediate point 168 in FIG. 11 to reduce the complexity of the drawing downstream from intermediate point 168.

A mapping function relating three-dimensional object space to two-dimensional light-field space can be defined with respect to microlens 144k as follows:

$$r_{k,xy}'' = M_{Total} r_{xy} + r_{k,xy}(1 - M_{ML}) \quad (1)$$

Where the subscript xy indicates the lateral components of the associated vector. This equation holds irrespective of whether the imaging system displays an inverted image or not and whether the microlens array images a real (inverted or not inverted image) or a virtual image (inverted or not inverted). The presence or absence of inversion is contained in the sign of the corresponding magnification value as described below.

A schematic of the mapping geometry for Equation 1 is shown in FIGS. 11 and 12, which respectively illustrate the imaging of a real inverted image and a virtual inverted image by the microlens array. The vector r is a vector representing object point 162 in object plane 134 of three-dimensional object space 78, $\vec{r}_k$ is a vector representing the position of the optical axis of microlens 144k, $M_{Total}$ is the total magnification of the system (e.g., produced by a combination of objective 132 and microlens array 142), $M_{ML}$ is the magnification due to microlens array 142 alone, and $\vec{r}_k''$ is a vector representing a point in light-field plane 76 corresponding to r in object space 78.

Each of vectors $\vec{r}$, $\vec{r}_k$, and $\vec{r}_k''$ has a tail at optical axis 128. However, the optical axis used for mapping does not have to be the actual optical axis, but instead may be defined from a light-field image as a virtual, global optical axis. Downstream chief rays 178 extend from intermediate image point 168, through at least a two-dimensional subset of microlenses 144, to a corresponding number of light-field image points on image sensor 146, as described above for FIGS. 7, 9, and 10. One of downstream chief rays 178 passes through microlens 144k and is incident on light-field plane 76 at $\vec{r}_k''$.

Equation 1 can be derived as follows. Object point $\vec{r}$ in object plane 134 maps to an intermediate image point 168, represented by vector $\vec{r}'$, according to Equation 2:

$$r_{xy}' = M_{Objective} r_{xy} \quad (2)$$

Where $M_{objective}$ is the collective magnification provided by objective 132 of light-field microscope 112 at intermediate image plane 170 and $r_{xy}'$ are the lateral components of vector $\vec{r}'$. In the case of FIGS. 11 and 12, $M_{objective}$ will be a negative number.

Intermediate image point $\vec{r}'$ maps to $\vec{r}_k''$ of two-dimensional light-field space (i.e., light-field plane 76) via microlens 144k according to Equation 3:

$$r_{k,xy}'' = r_{k,xy} + M_{ML}(r_{xy}' - r_{k,xy}) \quad (3)$$

In the case of FIG. 11, $M_{ML}$ will be negative since it will invert again the real image produced by the microscope, whereas in the case of FIG. 12, $M_{ML}$ will be a positive number.

Equation 3 can be rearranged and regrouped to produce Equations 4 and 5:

$$r_{k,xy}'' - r_{k,xy} = M_{ML} \cdot r_{xy}' - M_{ML} \cdot r_{k,xy} \quad (4)$$

$$r_{k,xy}'' = r_{k,xy}(1 - M_{ML}) + M_{ML} \cdot r_{xy}' \quad (5)$$

Substituting for $\vec{r}'$ in Equation 5 according to Equation 2 yields Equation 6:

$$r_{k,xy}'' = r_{k,xy}(1 - M_{ML}) + M_{ML} \cdot M_{Objective} \cdot r_{xy} \quad (6)$$

Magnification within light-field microscope 112 can be described by Equation 7:

$$M_{Total} = M_{Objective} \cdot M_{ML} \quad (7)$$

Substituting within the righthand term of Equation 6 according to Equation 7 yields Equation 1.

The mapping geometry is sufficiently defined once the total magnification and the microlens magnification are known (e.g., measured). In general, each of these magnifications depends on the distance between object plane 134 and objective 132 (i.e., the z-position of object plane 134). Local aberrations (e.g., due to the microlens array) can be expressed by a total magnification that varies with each microlens image. This leads to Equations 8 and 9:

$$M_{Total} = M_{Total}(z, x_k'', y_k'') \quad (8)$$

$$M_{ML} = M_{ML}(z) \quad (9)$$

The magnification due to the microlens array can be determined with a calibration target by evaluating the parallax (also called the virtual depth) between neighboring views of the same object point of the calibration target using Equation 10:

$$M_{ML}(z) = \frac{x_1''(z) - x_2''(z) - d_{MLA}}{d_{MLA}} \quad (10)$$

Where $d_{MLA}$ is the pitch of the microlens array and $x_i''(z)$ is the (z-dependent) position of the common object point in the image of the i-th microlens. In order to determine the correct sign of $M_{ML}$, one has to know whether the microlens array is placed upstream or downstream of the image plane of the microscope image plane. In the first case, the microlens array images a virtual image, and in the second case a real image. In general, this does not restrict the applicability of the approach since the location of the microscope image plane is either located at the native image sensor position or can be easily by moving the image sensor with respect to the microlens array along the z-axis downstream of the microscope objective. Note that the sign of $M_{Total}$ can also vary depending on the inversion properties and associated signs of $M_{Objective}$ and $M_{ML}$. However, a sign change in the total magnification only leads to an inversion in object space that is, in general, not relevant. In other words, one only needs to know whether the microlens array is inserted between the native image plane of the microscope and the upstream optics, or downstream of the native image plane. It is not necessary to know the exact distance between the microlens array and the native image plane.

V. Selected Aspects

This example describes selected aspects of the present disclosure as a series of indexed paragraphs.

Paragraph 1. A method of imaging a sample, the method comprising: (a) capturing a light-field image of the sample in a light-field plane; (b) forward-projecting the light-field image computationally to each of a plurality of z-planes in object space to generate a set of z-plane images; (c) comparing, with respect to the light-field image, a backward projection to the light-field plane of the same xy-region in object space from each z-plane image, to determine a respective degree of correspondence between the backward-projected xy-region from each of the z-plane images and the light-field image, wherein comparing is repeated for each of a plurality of different xy-regions in object space; (d) selecting based on comparing, for each different xy-region, at least one of the forward-projected images to contribute data for the different xy-region in an object-space image of the sample; and (e) generating the object-space image of the sample.

Paragraph 2. The method of paragraph 1, wherein each of the different xy-regions corresponds to a single pixel in each of the z-plane images of the set.

Paragraph 3. The method of paragraph 1, wherein at least one of the different xy-regions corresponds to a group of pixels or an object.

Paragraph 4. The method of any of paragraphs 1 to 3, wherein the object-space image generated is a two-dimensional image.

Paragraph 5. The method of paragraph 4, wherein the two-dimensional image is substantially all in focus.

Paragraph 6. The method of any of paragraphs 1 to 3, wherein the object-space image is a three-dimensional image.

Paragraph 7. The method of paragraph 6, wherein the three-dimensional image is substantially all in focus.

Paragraph 8. The method of any of paragraphs 1 to 7, wherein selecting includes selecting, for at least one of the different xy-regions, only one of the z-plane images for which the degree of correspondence is higher than for each other z-plane image of the set.

Paragraph 9. The method of any of paragraphs 1 to 8, wherein selecting includes selecting, for at least one of the different xy-regions, at least two of the z-plane images for which the corresponding degrees of correspondence of backward projection are higher than for each other z-plane image of the set.

Paragraph 10. The method of paragraph 9, further comprising comparing the respective degrees of correspondence for backward projection of a given xy-region to a threshold, wherein selecting includes selecting each z-plane image for which comparing the respective degrees of correspondence meets a predefined condition.

Paragraph 11. The method of any of paragraphs 1 to 10, wherein selecting includes selecting a best z-plane in object space for groups of pixels or single pixels in object space, and wherein generating includes generating a substantially all-in-focus three-dimensional image of the sample.

Paragraph 12. The method of any of paragraphs 1 to 11, wherein selecting includes selecting a best z-plane in object space for groups of pixels or single pixels in object space, and wherein generating includes generating a substantially all-in-focus two-dimensional image of the sample.

Paragraph 13. The method of any of paragraphs 1 to 12, wherein selecting includes selecting two or more z-planes in object space for each of a plurality of single pixels or groups of pixels in object space, further comprising combining information from the two or more z-planes selected for each single pixel or group of pixels.

Paragraph 14. The method of paragraph 13, wherein combining information includes averaging or interpolating values for the single pixel or group of pixels from the two or more z-planes selected.

Paragraph 15. The method of paragraph 13, wherein combining information is based on the respective degrees of correspondence for the single pixel or group of pixels from the two or more z-planes selected.

Paragraph 16. The method of any of paragraphs 1 to 15, further comprising computationally backward-projecting each of the z-plane images of the set to the light-field plane to obtain a set of backward-projected images, wherein comparing uses the set of backward-projected images.

Paragraph 17. The method of any of paragraphs 1 to 16, wherein capturing is performed by an image sensor of an imaging system, and wherein forward-projecting and each backward projection uses a known mapping geometry for the imaging system.

Paragraph 18. The method of paragraph 17, wherein the mapping geometry utilizes a value for a total magnification of the imaging system and at least one value for a magnification produced by a microlens array of the imaging system.

Paragraph 19. A system for imaging a sample, comprising: (a) a stage to hold a sample on an optical axis in object space; (b) a microlens array on the optical axis; (c) an image sensor configured to capture a light-field image of the sample formed with light that has propagated through the microlens array; and (d) a processor configured to (i) forward-project the light-field image computationally to each of a plurality of z-planes in object space to generate a set of z-plane images, (ii) compare, with respect to the light-field image, a backward projection to the light-field plane of the same xy-region in object space from each z-plane image, to determine a respective degree of correspondence between the backward-projected xy-region from each of the z-plane images and the light-field image, wherein comparing is repeated for each of a plurality of different xy-regions in object space, (iii) select for each different xy-region at least one of the z-plane images to contribute data for the different xy-region in an object-space image of the sample, and (iv) generate the object-space image of the sample.

The term "exemplary" as used in the present disclosure, means "illustrative" or "serving as an example." Similarly, the term "exemplify" means "illustrate by giving an example." Neither term implies desirability nor superiority.

While the invention has been described through the above examples and features, it will be understood by those of ordinary skill in the art that a wide variety of modifications, combinations and variations of the examples and features may be made without departing from the inventive concepts herein disclosed. Moreover, the invention should not be viewed as being limited to any specific purposes or embodiments described herein, but rather should be viewed as being applicable to accomplish a wide variety of purposes beyond those described herein. This disclosure described some examples of the present technology with reference to the accompanying drawings, in which only some of the possible examples were shown. Other aspects can, however, be embodied in many different forms and should not be construed as limited to the examples set forth herein even if not expressly exemplified in combination. Rather, these examples were provided so that this disclosure was thorough and complete and fully conveyed the scope of the possible examples to those skilled in the art.

We claim:

1. A method of imaging a sample, the method comprising:
   (a) capturing a light-field image of the sample in a light-field plane;
   (b) forward-projecting the light-field image computationally to each of a plurality of z-planes in object space to generate a set of z-plane images;
   (c) comparing, with respect to the light-field image, a backward projection to the light-field plane of the same xy-region in object space from each z-plane image, to determine a respective degree of correspondence between the backward-projected xy-region from each of the z-plane images and the light-field image, wherein comparing is repeated for each of a plurality of different xy-regions in object space;
   (d) selecting based on comparing, for each different xy-region, at least one of the z-plane images to contribute data for the different xy-region in an object-space image of the sample; and
   (e) generating the object-space image of the sample.

2. The method of claim 1, wherein each of the different xy-regions corresponds to a single pixel in each of the z-plane images of the set.

3. The method of claim 1, wherein at least one of the different xy-regions corresponds to a group of pixels or an object.

4. The method of claim 1, wherein the object-space image generated is a two-dimensional image.

5. The method of claim 4, wherein the two-dimensional image is substantially all in focus.

6. The method of claim 1, wherein the object-space image is a three-dimensional image.

7. The method of claim 6, wherein the three-dimensional image is substantially all in focus.

8. The method of claim 1, wherein selecting includes selecting, for at least one of the different xy-regions, only one of the z-plane images for which the degree of correspondence is higher than for each other z-plane image of the set.

9. The method of claim 1, wherein selecting includes selecting, for at least one of the different xy-regions, at least two of the z-plane images for which the corresponding degrees of correspondence of backward projection are higher than for each other z-plane image of the set.

10. The method of claim 9, further comprising comparing the respective degrees of correspondence for backward projection of a given xy-region to a threshold, wherein selecting includes selecting each z-plane image for which comparing the respective degrees of correspondence meets a predefined condition.

11. The method of claim 1, wherein selecting includes selecting a best z-plane in object space for groups of pixels or single pixels in object space, and wherein generating includes generating a substantially all-in-focus three-dimensional image of the sample.

12. The method of claim 1, wherein selecting includes selecting a best z-plane in object space for groups of pixels or single pixels in object space, and wherein generating includes generating a substantially all-in-focus two-dimensional image of the sample.

13. The method of claim 1, wherein selecting includes selecting two or more z-planes in object space for each of a plurality of single pixels or groups of pixels in object space, further comprising combining information from the two or more z-planes selected for each single pixel or group of pixels.

14. The method of claim 13, wherein combining information includes averaging or interpolating values for the single pixel or group of pixels from the two or more z-planes selected.

15. The method of claim 13, wherein combining information is based on the respective degrees of correspondence for the single pixel or group of pixels from the two or more z-planes selected.

16. The method of claim 1, further comprising computationally backward-projecting each of the z-plane images of the set to the light-field plane to obtain a set of backward-projected images, wherein comparing uses the set of backward-projected images.

17. The method of claim 1, wherein capturing is performed by an image sensor of an imaging system, and wherein forward-projecting and each backward projection uses a known mapping geometry for the imaging system.

18. The method of claim 17, wherein the known mapping geometry utilizes a value for a total magnification of the imaging system and at least one value for a magnification produced by a microlens array of the imaging system.

19. A system for imaging a sample, comprising:
(a) a stage to hold a sample on an optical axis in object space,
(b) a microlens array on the optical axis;
(c) an image sensor configured to capture a light-field image of the sample formed with light that has propagated through the microlens array; and
(d) a processor configured to
(i) forward-project the light-field image computationally to each of a plurality of z-planes in object space to generate a set of z-plane images,
(ii) compare, with respect to the light-field image, a backward projection to the light-field plane of the same xy-region in object space from each z-plane image, to determine a respective degree of correspondence between the backward-projected xy-region from each of the z-plane images and the light-field image, wherein comparing is repeated for each of a plurality of different xy-regions in object space,
(iii) select for each different xy-region at least one of the z-plane images to contribute data for the different xy-region in an object-space image of the sample, and
(iv) generate the object-space image of the sample.

20. A non-transitory computer readable medium having instructions which cause a processor to perform the method of claim 1.

* * * * *